United States Patent

[11] 3,620,450

| [72] | Inventor | Paul Leuenberger<br>Bern, Switzerland |
|---|---|---|
| [21] | Appl. No. | 866,553 |
| [22] | Filed | Oct. 15, 1969 |
| [45] | Patented | Nov. 16, 1971 |
| [32] | Priority | Oct. 21, 1968 |
| [33] | | Switzerland |
| [31] | | 15682/68 |

[54] ELECTRICALLY HEATED CENTRAL HOT WATER HEATING SYSTEM
12 Claims, 3 Drawing Figs.

| [52] | U.S. Cl. | 237/8 |
| [51] | Int. Cl. | F24d 3/02, F24d 3/10 |
| [50] | Field of Search | 237/8; 219/297-305 |

[56] References Cited
UNITED STATES PATENTS

| 2,058,769 | 10/1936 | Brown | 219/297 |
| 2,434,575 | 1/1948 | Marshall | 237/8 |
| 3,105,137 | 9/1963 | Sullivan et al. | 237/8 UX |

*Primary Examiner*—Edward J. Michael
*Attorney*—McGlew and Toren

ABSTRACT: An electrically heated central hot water system includes at least two separate interconnected vessels providing a series arranged heated storage water column. The heating means for the water is located within only one vessel with the interconnection of the vessels being arranged for withdrawing water from the lower zone of the unheated vessel and charging it into the upper zone of the other vessel where the heating means are located. In this manner, the water in both vessels is heated to a desired level. The heated water is used to heat room convectors directly or to heat another source of water which circulates through the room convectors. In providing heat for the convectors the heated water from the unheated vessel is returned to the heated vessel so that its stored heat may be utilized.

INVENTOR
Paul Leuenberger
by
McGlew & Toren
ATTORNEYS

ELECTRICALLY HEATED CENTRAL HOT WATER HEATING SYSTEM

SUMMARY OF THE INVENTION

The present invention is directed to an electrically heated central hot water heating system comprised of a central water heating device which is connected with convectors by a conduit system and, more particularly, the invention is directed to an arrangement of interconnected vessels or boilers, wherein only one of the vessels contains the heating means for the water, and the interconnected vessels provide a series arranged heat storage water column.

Underlying the present invention is the problem of providing a particularly economical arrangement for a central hot water heating system which is operable by means of offpeak potential, that is, potential normally available during the night time or offpeak hours.

In known electrically operated central hot water heating systems using water columns for heat storage, where the heating of the water takes place during the offpeak potential hours, the heating device is positioned within a boiler zone which extends over a large portion of the boiler height. In such an arrangement, a thermal-syphonic effect is produced by means of partitions within the boiler zone, and water circulation takes place which effects a temperature equalization within the boiler. As a result, the storage water in the boiler is mixed continuously, though slowly, during the heating up period until the entire contents of the boiler have reached the desired maximum temperature. In such an arrangement, with the water being mixed continuously, the desired maximum heating temperature is not available at any particular point or zone in the boiler. To increase the storage volume, it has been proposed in the past to arrange several storage boilers or vessels in side-by-side arrangement, with only one of the boilers being heated, and to connect these boilers in a parallel circuit, that is, the upper zone of each boiler is connected with the upper zone of the next adjacent boiler and, similarly, the lower zone of each boiler is connected with the lower zone of the next adjacent boiler. Accordingly, though the quantity of water serving for heat storage is increased, the charging period required to attain the maximum temperature for the overall arrangement is considerably prolonged.

Therefore, the primary object of the invention is to provide a system of the general type mentioned above, however, wherein the arrangement of the system affords the elimination of the disadvantages mentioned. The distinguishing characteristic of the present invention over the systems used in the past is the arrangement of the heating means for the water within an upper boiler zone which communicates with a lower boiler zone in the vessel through a flow path located outside of the vessel. In supplying water into the upper zone a circulating pump is located within a conduit for supplying water into the upper boiler zone and the operation of the pump is controlled as a function of the water temperature within the upper zone.

When water is used as the storage mass, the temperature difference which exists from the beginning to the end of the heat transfer is relatively small, so that the exact proportioning and arrangement of the heat transfer surfaces in accordance with the heating requirements can be provided without difficulty. In the present system cooler water is pumped from a lower boiler zone through a conduit arrangement into the upper boiler zone which contains the heating element and, as a result, the heated water in the upper zone is pushed downwardly until the entire water column in the boiler or vessel has been heated up to a uniform temperature. To enable the storage of large quantities of heat when water is used as the storage mass, a corresponding large volume is required, such as provided by a number of series-connected storage vessels, each of which contains a water column. However, though multiple vessels are employed for storing the heated water column, it is advantageous if only one of the vessels acts as a boiler containing a heating element within an upper zone with the water from the other vessels being arranged to circulate through the heated vessel or boiler. In this arrangement, the lower region or zone of each storage vessel is interconnected with the upper zone of the next vessel by means of piping. Moreover, for the accommodation of a single large water column, it is possible to use a very tall storage vessel located, for example, in the staircase of a building with the heating means located in its upper zone.

For supplying heat to convectors in a heating system, the water in the storage boilers or vessels which provide heat storage may also be supplied to the convectors being withdrawn from the upper zone of the heated vessel into the heating system and returned to the lower zone one of the interconnected but unheated vessels.

In controlling the heating device, a thermostat can be employed for measuring the temperature of the water being heated in the region of the heating element. Advantageously, the storage boilers or vessels are not completely filled with water so that a portion of their volume can serve as an expansion space obviating the need for a separate vessel to serve such a function. Another object of the present invention is to improve the arrangement of the heating system, in particular, with respect to its economic efficiency. Further, the invention is characterized by the use of a particular form of heat convectors which are made of groups of thin-walled flattened tubes. The tubes are disposed in a bundle arrangement extending in parallel relationship and are joined together by thin air-conduction sheets to form tube bundles.

These convectors are notable for their small water content yet very large heat-transmitting surface. Accordingly, in such a heating system, copper pipes of small diameter may be used for the installation lines. Further, in this arrangement the inertia of the heating system is reduced to a minimum because of the low water content and low radiator or convector weight. This convector arrangement avoids temporary overheating of a room which occurs in the use of conventional convectors when a sudden solar radiation or additional heat sources (human, illumination, electrical equipment, etc.) is provided. Moreover, the heat loss which occurs when a window or door is open temporarily, due to the penetration of cold air into the room, is also correspondingly low. The savings in heating energy connected with these different advantages over heating systems employing standard convectors is about 20 to 40 percent. This savings is of considerable importance since the energy used for heating is relatively expensive.

As an alternative to using the stored heating water for the heating system, it is possible to employ a heat exchanger within the storage boiler for heating the water which flows through the heating system. Where a heat exchanger is utilized, it is advantageous if it is positioned within the upper zone of the storage water column. If the system includes at least two storage vessels, each of which contains a portion of the total water column, the heat exchanger should be positioned within the storage vessel which contains the heating device.

In a system which comprises at least two storage vessels each of which contains a portion of the storage water column, it is possible to interconnect the vessel containing the heating means with the following vessel by means of four separate conduit sections. When using the four conduit sections, the first is connected into the upper zone of the heated vessel or boiler, the second is connected to the lower zone of the heated vessel, the third is connected to the upper zone of the other vessel and the fourth is connected to the lower zone of the other vessel, and the conduit sections are interconnected by multiway valves so that for the charging and heating up phase the first conduit section which contains a pressure pump is connected to the fourth conduit sections for supplying water from the lower zone of the second vessel into the upper heated zone of the first vessel. Similarly, the second conduit section is connected to the third conduit section for circulating the water from the lower zone of the heated vessel to the upper zone of the second vessel. When the heat-discharge phase of the system is in effect, the first conduit section can be connected to the third conduit section and the second conduit section to the fourth conduit section for providing the desired flow of water within the water storage column.

Heat measurement means, such as thermostats, are positioned in the region of the heating element within the heated vessel for determining the temperature of the water in the upper zone of the vessel. Based on the temperature in the upper zone, the pressure pump can be activated for supplying water into the upper zone during the charging or heating phase of the system. Similarly, where necessary, a second heat-measuring device is positioned in the lower zone of the vessel containing the heating element for regulating the operation of the pump during the heat-discharge phase within the water storage column. Where a plurality of storage vessels are employed, it is advantageous to interconnect the expansion spaces in the upper regions of the vessels by means of piping and to provide a pressure release valve in the piping.

To achieve the optimum charging of the water into the vessels in a simple manner, it is advisable to locate a valved overflow line from the vessel positioned at a distance below its upper end which distance corresponds to the desired height of the expansion space within the vessel.

Additionally, the heated storage water column can serve to heat a supply of service water with the service water line including a heat exchanger positioned within the upper zone of the heated vessel.

The various features of novelty which characterize the invention are pointed out with particularity in the claims annexed to and forming a part of this specification.

For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
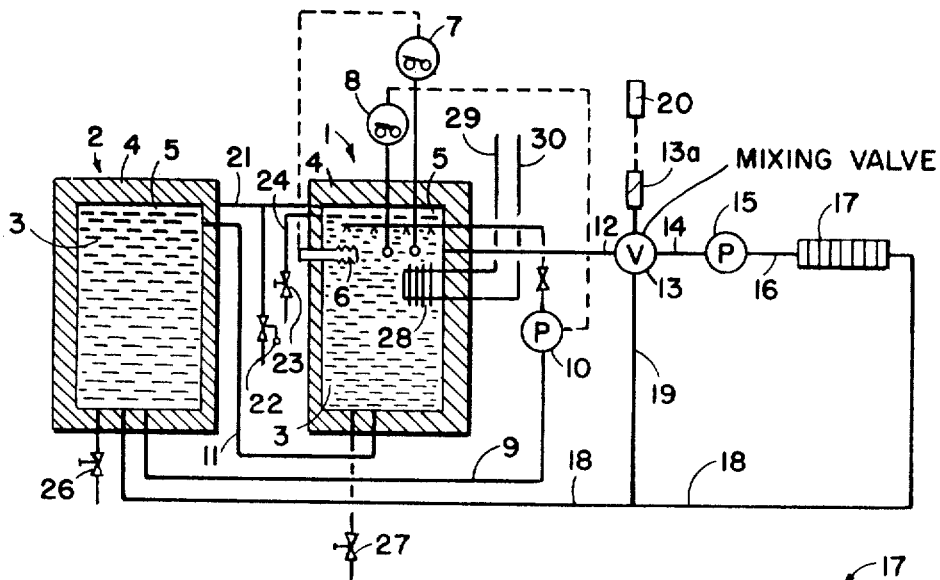
FIG. 1 provides a diagrammatic arrangement of a hot water heating system containing two interconnected storage vessels forming a storage water column which serves as the storage medium and also as the circulating medium in the heating cycle.

In FIG. 1, a central hot water heating system is shown containing storage vessels or boilers 1 and 2 filled with water 3 which together constitute a storage water column. The storage vessels 1 and 2 are enclosed by insulation 4. In each of the vessels an expansion space 5 is provided above the level of the water 3 providing an air cushion. The expansion spaces 5 are interconnected by a pipe line 21 containing a pressure relief valve 22. In the storage vessel 1, a water outlet 24 containing a manually operable valve 23 is located at the height of the maximum water level.

In the upper region of the storage water column, that is, in the upper zone of the storage vessel 1, a heating element 6 is provided for heating the water. Disposed approximately in the horizontal plane of the heating element 6 are a pair of heat measuring devices 7 and 8, such as thermostats, for measuring the temperature of the water adjacent the heating element. A first conduit line 9 interconnects the lower zone of the storage vessel 2 to the upper zone of the storage vessel 1. A pressure pump 10 is positioned in the conduit line 9 and a check valve is located between the pump and the first storage vessel 1. Interconnecting the lower zone of the storage vessel 1 and the upper zone of the storage vessel 2 is a conduit line 11.

The piping arrangement for the heating system is connected to the upper zone of the first storage vessel 1 by means of a line 12. The line 12 is connected to a mixing valve assembly 13, 13a which is regulated by a room thermostat 20. After the heating water flows through the mixing valve it circulates through a line 14, a pressure pump 15, another line 16, through a convector 17 and then is returned through a line 18 into the lower zone of the second storage vessel 2. A connection 19 is provided between the return line 18 and the mixing valve assembly 13, 13a. Each of the storage vessels 1 and 2 has a discharge valve 26, 27, respectively, at its lower end.

In the upper zone of the storage vessel 1, a heat exchanger 28 is positioned for heating service water. Cold water is supplied to the heat exchanger 28 through a line 29 and after being heated by indirect heat transfer with the heated water within the storage vessel 1, hot water is supplied from the heat exchanger through a line 30 to a number of tapping points.

The hot water heating system illustrated in FIG. 1 operates in the following manner: initially, with the valve 23 in line 24 open, water is filled into the system until it starts to overflow through the line 21. When this occurs, the valve 23 is closed and, due to the location of the line 24 relative to the top of the vessels, a sufficient expansion space is provided within the vessels.

Next, the heating element 6 is switched on and the water in the upper zone of the storage vessel 1 located in the vicinity of the heating element is heated to a predetermined temperature, for example, about 125° C. This high temperature is obtainable because of the pressure relief valve 22 maintained in the line 24 interconnecting the expansion spaces in the upper ends of the vessels. When the predetermined temperature is reached, the thermostat 8 actuates the pressure pump 10 and cold water is withdrawn from the lower zone of the storage vessel 2 through the line 9 and is mixed with the heated water in the upper zone of the vessel 1. As the incoming cold water mixes with the heated water, the temperature of the water drops to a predetermined level, for example 120° C., and the thermostat 8 thereupon shuts off the pressure pump. The heating element continues to heat the water and this step process is repeated until both of the storage vessels 1 and 2 are filled with hot water, the conduit 11 serving to supply the heated water from the storage vessel 1 into the storage vessel 2. When all of the water has been heated up to the desired temperature, the further supply of water from the storage vessel 2 will result in an increase in the temperature of the water about the heating element 6, whereupon the thermostat 7 turns off the heating element.

For heating rooms and the like, the heated water within the storage water column is withdrawn from the storage vessel 1 through line 12 to the mixing valve assembly 13, 13a, the room thermostat 20 regulates the mixture of the water supplied through the mixing valve 13 into the line 14. From the line 14, the heated water flows, in turn, through the pressure pump 15, and the line 16 into the convector 17 for giving up its heat and then returns through the line 18 into the lower zone of the storage vessel 2 or a certain amount is recirculated through the line 19 into the mixing valve. The water circulating in the heating cycle is accelerated by the pressure pump 15. In this setup the same amount of water which is added to the heating cycle passing into the mixing valve assembly 13, 13a is supplied to the lower part of the storage vessel 2 as cold water flowing through the downstream portion of the line 18, and, at the same time, the heated water located within the storage vessel 2 is supplied to the storage vessel 1 by means of the connecting line 11 extending between the upper zone of the storage vessel 2 into the lower zone of the storage vessel 1. This circulation of the water within the heating system continues until a complete discharge of the heat within the storage column is accomplished.

Figure 2:
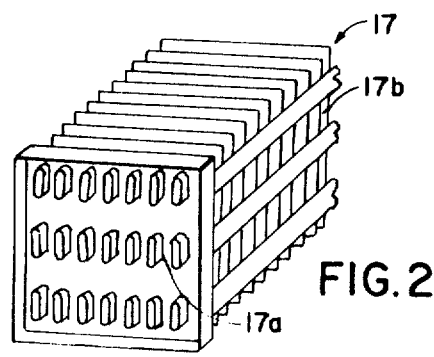
FIG. 2 is a perspective view of a heat convector usable in the system shown in FIG. 1.

In FIG. 2 a diagrammatic representation is provided of the convector 17 utilized in the system illustrated in FIG. 1. The convector is formed of a bundle of flat tubular members 17a arranged in a number of parallel rows. At each end of the convector the tubular members 17a are secured into chambers and thus are connected in parallel. The tubular members 17a are relatively small and, for example, have the following dimensions: width—2 mm. and height—12 mm. with a wall thickness of about 0.25 mm. At a number of spaced locations along the length of the tubular members, air-guide sheets 17b, having a thickness of about 0.1 mm., are provided for securing the tubular members into a bundle.

For a practical comparison between a hot water heating system using ordinary convectors and a system using the convectors 17 shown in FIG. 2, the following results were observed: with the conventional convectors a connected load of 28.6 kw. was required, the quantity of water used was 4,360 l. and the radiation surface was 46.5 sq.m. However, in the system employing the convectors illustrated in FIG. 2, the connected load was only 23.8 kw., the quantity of water required was 3,640 l. and the required radiation surface was 23.2 sq.m. Accordingly, the saving in heat energy was about 20 percent.

Figure 3:
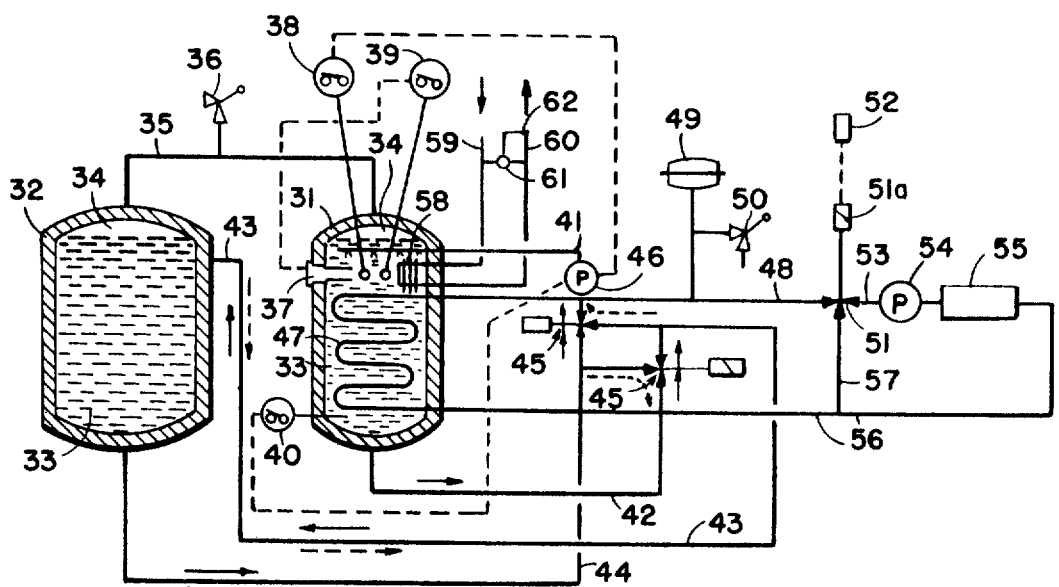
FIG. 3 is another diagrammatic arrangement of a hot water heating system which utilizes two interconnected storage vessels, however, in this arrangement the heat storage water column and the water for the heating system are separate from one another.

In FIG. 3 another central hot water heating system is disclosed, similar to that in FIG. 1, however, incorporating a separate supply of heating water for the heat circulation system. In this arrangement, two storage vessels 31, 32 are filled with water 33 and form the storage water column. Expansion spaces 34 are provided in each of the vessels above the maximum level of the water. The expansion spaces 34 in the storage vessels 31, 32 are interconnected by means of a line 35 to which a pressure relief valve 36 is connected.

As in the system previously described, an electric heating unit 37 is positioned only in the upper zone of the storage vessel 31. Two thermostats 38, 39 are located adjacent the heating unit 37 for determining the water temperature in that region, another thermostat 40 is positioned in the lower zone of the vessel 31 for measuring the water temperature in that region. The two storage vessels 31, 32 are interconnected by four conduit sections 41, 42, 43 and 44. Tubing section 41 contains a pressure pump 46 and is connected into the upper zone of storage vessel 31. Conduit section 42 is connected into the lower zone of the storage vessel 31 while the conduit sections 43 and 44 are connected into the upper zones and lower zone of the storage vessel 32, respectively. The four conduit sections are connected together by means of a pair of multiway valves 45, 46. The pressure pump 46 is positioned in the conduit section 41 between the multiway valves and the inlet to the storage vessel 31.

As indicated above, a separate heating water circulation system is provided in this arrangement in the form of a heat exchange coil 47 located within the storage vessel or boiler 31 below the level of the heating element 37. Extending from the heat exchanger is a line 48 to which an expansion vessel 49 is connected with a pressure release valve being disposed between the expansion vessel and the line 48. Downstream from the expansion vessel, a mixing valve assembly 51, 51a is provided which is controlled by a room thermostat 52. The water flowing through the mixing valve 51 passes in turn through a line 53, a pressure pump 54, a convector 55 and a return line 56. The return line 56 conveys the water back to the heat exchange coil 47, however, a cross connection line 57 is provided upstream from the heat exchange coil between the return line 56 and the mixing valve 51.

Another heat exchange coil 58 is provided in the upper zone of the storage vessel 31 for heating service water. Cold water is supplied to the heat exchanger coil 58 through line 59 and after the water is heated it is circulated through line 60 to various tapping points. Spaced from the heat exchange coil 58 is a cross connection line 61 containing a mixing valve and extending between the lines 59 and 60. A thermostat 62 is provided for regulating the mixing valve in the connecting line 61.

The central hot water heating system illustrated in FIG. 3 operates in the following manner: during the charging or heat supply phase of the system, the heating element 37 heats the water in the upper zone of the storage boiler 31 to a predetermined temperature of about 125° C. When the predetermined temperature is reached, the thermostat 38 actuates the pump 46 and cold water from the lower zone of the storage vessel 32 flows through conduits 44, 41 into the vessel 31 (note the solid arrows shown in FIG. 3). As the incoming cold water mixes with the heated water and the temperature of the water is reduced to about 120° C., the thermostat 38 turns off the pump 46. This process is repeated until the water in the upper zone of the vessel about the heating element 37 again reaches 125° C., this step process is repeated continuously until the water contained within the storage vessel 31 is heated to the predetermined temperature, the heating taking place from the top to the bottom of the vessel. When the contents of the storage vessel 31 is heated, the water in the storage vessel 32 is heated in the same manner with the water flowing through the conduits 42, 43 connected in series as shown by the solid arrows. When all of the water in the two vessels has been heated to the desired temperature only water at the predetermined temperature is circulated into the storage vessel 1, and, as a result, the water heats up to a higher temperature of about 130° C. and when the higher temperature is reached the thermostat 39 disconnects the heating element since the entire water storage column has been charged to the desired level.

During the heat discharge phase of the heating system, heat is removed from the storage column in the storage vessel 31 by means of the heat exchange coil 47 with the path of heat removal being reversed from the heat charging phase, that is, the heat is removed from the lower to the upper portions of the storage vessel 31. During the heat discharge phase, the multiway valves 45, 46 (reversing or deflecting valves may be substituted for the multiway valves) connect conduit 41 to conduit 43 and conduit 42 to conduit 44 (note the arrows shown in broken lines). When the water temperature in the lower zone of the storage vessel 1 has dropped to about 50° C. the thermostat 40 turns on the pressure pump 46 and the pump circulates hot water from the upper zone of the storage vessel 2 through conduits 43, 41 into the upper zone of the storage vessel 31. At the same time, the water which has been reduced in temperature flows from the lower zone of the storage vessel 31 through conduits 42 and 44 into the lower zone of the storage vessel 32. When the water in the lower zone of the storage vessel 31 has been heated to about 60° C. by the heated water flowing downwardly from above, the thermostat 40 turns off the pressure pump 46. This step process is continued as long as heat is required in the heat circulation system or until the entire supply of heat within the storage water column is discharged.

In this arrangement the expansion of the storage water takes place in the expansion spaces 34 in the upper ends of the storage vessels 31, 32. Accordingly, there is no need for an additional expansion vessel for the storage water column. The level of the storage water temperature can be determined by the selection of the pressure relief valve in accordance with local regulations and based on the storage boiler construction. In addition to the storage vessel or boiler 31 which contains the heating unit 37, any number of additional storage vessels may be utilized. Further, it is possible to replace a plurality of storage vessels connected in series with one single very tall vessel which, for example, can be accommodated within the stair well in a building.

What is claimed is:

1. An electrically heated central hot water heating system for supplying heated water from a central water heating device to convectors for heating purposes wherein the improvement comprises said central water heating device comprising at least a first closed vessel, a heating device disposed within the upper zone of said vessel for heating water contained therein, conduit means communicating between the lower zone of said vessel and the upper zone of said vessel, a heat-measuring device located within the upper zone of said vessel for measuring the temperature of the water adjacent said heating device, a circulating pump disposed in said conduit means and actuated by said heat-measuring device for supplying water to be heated from the lower zone of said vessel to the upper zone of said vessel, said central water heating device comprising said first closed vessel and a second closed vessel, each of said first and second vessels having an upper zone and a lower zone, said heating device disposed within the upper zone of said first vessel for heating water contained therein, said conduit means communicating between the lower zone of said second vessel and the upper zone of said first vessel and between the lower zone of said first vessel and the upper zone of said second vessel, said circulating pump being positioned in said conduit means between the lower zone of said second vessel and the upper zone of said first vessel for supplying water to be heated from the lower zone of said second vessel to the upper zone of said first vessel, and said second vessel arranged to receive heated water from said first vessel for forming in series with said first vessel a heat storage water column.

2. An electrically heated central hot water heating system, as set forth in claim 1, wherein each of said first and second vessels is arranged to contain a water level spaced below the upper end thereof for forming an expansion space between the water level and the upper end of each said vessels.

3. An electrically heated central hot water heating system, as set forth in claim 1, wherein means are arranged for supplying heating water from said vessels for heating convectors.

4. An electrically heated central hot water heating system, as set forth in claim 3, wherein said means for supplying hot water comprises a pipe line connected to said first vessel and opening therein into the upper zone thereof containing said heating element, a mixing valve assembly positioned within said pipe line exteriorly of said first vessel, a room thermostat in communication with said mixing valve assembly for regulating said mixing valve, a convector connected to said pipe line at a location spaced downstream from said mixing valve, a pressure pump positioned in said pipe line between said mixing valve and said convector, a return line secured at one end to said convector and at its opposite end to said second storage vessel, and a line interconnecting said return line and said mixing valve.

5. An electrically heated central hot water heating system, as set forth in claim 3, wherein said means for supplying hot water comprises a heat exchange coil located within said first storage vessel below said heating element in the upper zone of said vessel and extending downwardly toward the lower end of said vessel, an outlet line connected to said heat exchange coil and extending outwardly from said first vessel, a mixing valve assembly located within said outlet line spaced outwardly from said first storage vessel, a branch line secured to said outlet line between said first storage vessel and said mixing valve assembly, an expansion vessel disposed within said branch line and a pressure relief valve located in said branch line between said expansion vessel and said outlet line, a convector connected into said outlet line downstream from said mixing valve assembly, a pressure pump disposed within said outlet line between said mixing valve and said convector, a return line secured at one end to said convector and at its opposite end to said heat transfer coil, and a connecting line extending between said return line and said mixing valve.

6. An electrically heated central hot water heating system, as set forth in claim 1, wherein said conduit means comprises a first conduit member connected to said first storage vessel in the upper zone thereof, a second conduit member connected to said first storage vessel at the lower end thereof, a third conduit member connected to said second storage vessel in the upper zone thereof, and a fourth conduit member connected to the lower end of said second storage vessel, multiway valves interconnecting the ends of said conduit members remote from the connections thereof to said first and second storage vessels, said multiway valves being arranged to direct the flow from said second storage vessel to said first storage vessel through said fourth conduit member and said first conduit member during the heat-charging phase of the system and to direct water from said second storage vessel to said first storage vessel during the heat-discharging phase through said third conduit member and said first conduit member.

7. An electrically heated central hot water heating system, as set forth in claim 6, wherein a heat-measuring device located in the lower zone of said first storage vessel for measuring the temperature of the water in the vicinity of said heat exchange coil, said heat-measuring device being in communication with said pump in said first conduit member for actuating said pump for supplying water from said second storage vessel through said third conduit member and said first conduit member into the upper zone of said first storage vessel.

8. An electrically heated central hot water heating system, as set forth in claim 1, wherein a tubular member interconnecting the expansion spaces within said first and second storage vessels, and a pressure relief valve located within said tubular member.

9. An electrically heated central hot water heating system, as set forth in claim 2, wherein an outlet line is connected to said first storage vessel at a dimension below the upper end of said vessel equal to the height of the expansion space therein above the maximum water level, and a valve positioned within said overflow line.

10. An electrically heated central hot water heating system, as set forth in claim 1, wherein a service water heat exchange coil positioned within said first storage vessel in the upper one thereof adjacent said heating element for heating service water.

11. An electrically heated central hot water heating system, as set forth in claim 1, wherein said convector comprising a bundle of longitudinally extending tubular members arranged in parallel relationship, each of said tubular members comprising a flattened thin wall tubular section having a first transverse dimension and a second transverse dimension with the first transverse dimension being elongated and considerably greater than said second transverse dimension, and a plurality of thin wall plates located transversely of and at a number of spaced locations along the length of said tubular members for securing said tubular members into a bundle.

12. A method of operating a central hot water heating system comprising the steps of providing at least a first closed space, filling water into the closed space to a level affording an expansion space above the level of the water, interconnecting the upper part of the first space with the lower part thereof by a connection disposed exteriorly of the space, heating the water in the upper part of the closed space to a desired temperature and when the desired temperature is reached removing water from the lower part thereof through the exteriorly disposed connection and charging it into the upper part of the closed space until the temperature of the water in the upper part drops to a determined temperature level at which point the water charging is discontinued, repeating the water-heating and water-charging steps until the water in the closed space is heated to a predetermined level and utilizing the heat stored in the water in the closed space for heating purposes at locations spaced remotely from the closed space, providing a second space separate from said first closed space, interconnecting the upper part of said first closed space with the lower part of said second closed space and the lower part of said first closed space with the upper part of said second closed space, heating the water in the upper part of the first closed space and removing water from the lower part of said second closed space for charging it into the upper part of said first closed space in the step of heating the water and circulating heated water from the lower part of said first closed space to the upper part of said second closed space for forming an interconnected heat storage water column, and withdrawing the heat for heating purposes from said first storage space and circulating the heated water from said second storage vessel space to said first storage space for utilizing the heat stored in the storage water column.

* * * * *